United States Patent Office 3,452,137
Patented June 24, 1969

3,452,137
2-OXAZOLIDINONES AS STABILIZERS FOR AQUEOUS CHLORINE SOLUTIONS
Jack F. Mills and Charles K. McAnallen, Midland, Mich., assignors to The Dow Chemical Company, Midland, Mich., a corporation of Delaware
No Drawing. Filed Jan. 19, 1967, Ser. No. 610,229
Int. Cl. A61k 27/00; C02b 3/06
U.S. Cl. 424—149          6 Claims

ABSTRACT OF THE DISCLOSURE

A method of stabilizing aqueous chlorine solutions against reduction of the chlorine or hypochlorite concentration therein by adding thereto from about 5 to about 100 parts per million of at least one oxazolidinone having the formula

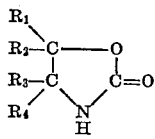

wherein $R_1$, $R_2$, $R_3$ and $R_4$ are independently selected from the group consisting of hydrogen, methyl, ethyl and 2-hydroxyethyl groups.

Background of the invention

Chlorine in aqueous solution and aqueous solutions containing hypochlorites are widely accepted as bactericides and find significant utility in the treatment of swimming pool water. When such solutions are used under conditions of exposure to sunlight, however, decomposition of the available chlorine apparently takes place with a consequent reduction of the level of bactericidal activity.

Summary of the invention

This invention relates to a method for stabilizing aqueous chlorine solutions and more particularly relates to a process whereby aqueous chlorine solutions are stabilized against the degrading effects of ultraviolet light.

It is, therefore, an object of the present invention to provide a method of stabilizing aqueous solutions containing chlorine or hypochlorite against loss of available chlorine due to the action of ultraviolet light. It is an additional object of the present invention to provide a process whereby chlorine in aqueous solution is sufficiently stabilized to provide continuous bactericidal protection to a body of water for extended periods of time even in the presence of ultraviolet light. A further object is to provide a relatively stable aqueous chlorine-containing solution having bactericidal properties. Other objects and advantages of the present invention will become apparent from the following specification.

It has now been discovered that by the addition of certain 2-oxazolidinones to aqueous chlorine solutions or solutions containing an aqueous hypochlorite such solutions are stabilized against reduction of the chlorine concentration thereof in the presence of ultraviolet light while at the same time maintaining an acceptable level of bactericidal activity for such aqueous chlorine solutions. Such 2-oxazolidinones will hereinafter be referred to as "chlorine stabilizers."

Description of preferred embodiments

The chlorine stabilizers useful herein are those compounds having the formula

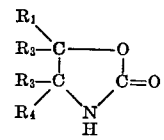

wherein $R_1$, $R_2$, $R_3$ and $R_4$ are independently selected from the group consisting of hydrogen, methyl, ethyl and 2-hydroxyethyl groups which are soluble in water at least to the extent of 5 p.p.m. Illustrative of such stabilizers are oxazolidinone, 4-methyl-oxazolidinone, 5-methyl-oxazolidinone, 4-ethyl-oxazolidinone, 5-ethyl-oxazolidinone, 4,4-dimethyl-oxazolidinone, 5,5-dimethyl-oxazolidinone, 4,4-diethyl-oxazolidinone, 5,5-diethyl-oxazolidinone, 4,4-di(2-hydroxyethyl)-oxazolidinone, 5,5-di(2-hydroxyethyl)-oxazolidinone, 4,4-di(2-hydroxymethyl)-oxazolidinone, 5,5-di(2-hydroxymethyl)-oxazolidinone, 4-methyl-5-ethyl-oxazolidinone, 4-ethyl-5-methyl-oxazolidinone, 4-methyl-5-(2-hydroxymethyl)-oxazolidinone, 4,4-dimethyl-5-ethyl-oxazolidinone, 4,4-diethyl-5,5-dimethyl-oxazolidinone, 4,4-diethyl-5,5-di(2-hydroxylethyl)-oxazolidinone and the like.

In general, chlorine is used as a germicide in swimming pools in a concentration of from 0.1 part per million to about 10.0 p.p.m. However, concentrations above 1 p.p.m. contribute considerably to eye irritation and corrosion problems. When used for germicidal or bleach solution, the chlorine concentration in water is normally from about 0.02% to about 10% by weight. If such aqueous solutions of chlorine are to maintain their bactericidal properties and are to maintain an effective chlorine concentration without effecting eye irritation or excessive corrosion, it is necessary to add from about 5 parts per million to about 100 p.p.m. of chlorine stabilizer to the chlorine-containing water. In general, the weight ratio of the chlorine stabilizer to the chlorine present should be from about 1.2:1 to about 10:1.

As the temperature of the aqueous chlorine solution increases, the difficulty of stabilization increases and the decay of chlorine concentration in the aqueous solution increases rapidly as the temperature approaches the boiling point of water. Likewise, as the temperature of the solution decreases, stabilization of the chlorine becomes less difficult. In general, the stabilization process and compositions contained herein are effective over the range of about 32° F. to about 200° F. at about atmospheric pressure and are particularly useful in a temperature range of from about 50° F. to about 100° F.

Addition of the chlorine stabilizer to the aqueous chlorine or hypochlorite solution may be achieved by any suitable means to achieve the desired proportion. For example, solid chlorine stabilizer may be added directly to the aqueous solution or the chlorine-containing solution may be passed through a bed of chlorine stabilizer or the stabilizer may be prepared as a relatively concentrated aqueous solution and the desired proportion of such solution added to the chlorine-containing solution to be stabilized.

The following examples are provided as a detailed description of the invention but the scope of such invention is not to be construed as limited thereby.

EXAMPLE 1

One liter portions of water having a pH of 7.5 and containing 5 p.p.m. chlorine were placed in 1500 ml.

beakers and various concentrations of substituted 2-oxazolidinones were added as stabilizers to the chlorine-containing water. The solutions were then exposed to ultraviolet light having an intensity at the surface of the solution of 6.2 E. vitons per square centimeter. Samples of the aqueous solution were taken every 30 minutes and analyzed for available chlorine to determine the half-life of the chlorine content. The results of these experiments are shown in the following tabulation:

| Chlorine stabilizer | Concentration, p.p.m. | Chlorine half-life, hrs. |
| --- | --- | --- |
| None (control) | | 2.6 |
| 2-oxazolidinone | 22 | 8.7 |
| 5-methyl-2-oxazolidinone | 7 | 7.8 |
| Do | 25 | 15.7 |
| 5-ethyl-2-oxazolidinone | 30 | 8.8 |
| 5,5-dimethyl-2-oxazolidinone | 28 | 10.0 |
| 4,4-dimethyl-2-oxazolidinone | 30 | 59 |
| Do | 10 | 30 |
| 4,4-di(2-hydroxyethyl)-2-oxazolidinone | 44 | 10.5 |

EXAMPLE 2

Into an outdoor public swimming pool containing 150,000 gallons of water having a pH of 7.5 to 8.0 chlorine was continuously metered at a rate of about 10 lb./day which produced a substantially constant chlorine concentration in the water of from 1 to 4 p.p.m. Samples of such water taken every 30 minutes showed the bacterial count to be continuously maintained below 200 bacteria/ml. of water.

In order to demonstrate the stabilizing effect of 2-oxazolidinone on the chlorine-containing water in the pool in the presence of sunlight, a level of from 5 to 10 parts per million of 2-oxazolidinone was maintained by intermittent addition. It was found that chlorine added at a rate of about 3 lbs./day would maintain a chlorine concentration of from 1 to 4 p.p.m. in the pool and a bacterial count below 200 bacteria/ml. of water.

We claim:
1. An aqueous composition comprising water containing from 0.1 to 10.0 p.p.m. chlorine and from about 5 to about 100 p.p.m. of a 2-oxazolidinone chlorine stabilizer having the formula

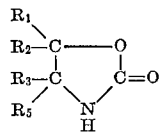

wherein $R_1$, $R_2$, $R_3$ and $R_4$ are independently selected from the group consisting of hydrogen, methyl, ethyl and 2-hydroxyethyl groups.

2. The composition according to claim 1 wherein the 2-oxazolidinone is 5-methyl-2-oxazolidinone.
3. The composition according to claim 1 wherein the 2-oxazolidinone is 5-ethyl-2-oxazolidinone.
4. The composition according to claim 1 wherein the 2-oxazolidinone is 5,5-dimethyl-2-oxazolidinone.
5. The composition according to claim 1 wherein the 2-oxazolidinone is 4,4-dimethyl-2-oxazolidinone.
6. The composition according to claim 1 wherein the 2-oxazolidinone is 4,4-di(2-hydroxyethyl)-2-oxazolidinone.

References Cited

UNITED STATES PATENTS 2,399,118   4/1946   Homeyer _____ 260—307.3

ALBERT T. MEYERS, Primary Examiner.

V. D. TURNER, Assistant Examiner.

U.S. Cl. X.R.

21—58; 210—59, 62; 252—187; 424—174, 272